United States Patent [19]

Job

[11] Patent Number: 4,657,995

[45] Date of Patent: Apr. 14, 1987

[54] OLEFIN POLYMERIZATION CATALYST COMPOSITIONS AND POLYMERIZATION PROCESS

[75] Inventor: Robert C. Job, Houston, Tex.

[73] Assignee: Shell Oil Company, Houston, Tex.

[21] Appl. No.: 741,095

[22] Filed: Jun. 4, 1985

Related U.S. Application Data

[60] Division of Ser. No. 657,861, Oct. 5, 1984, Pat. No. 4,535,068, which is a continuation-in-part of Ser. No. 534,016, Sep. 20, 1983, abandoned.

[51] Int. Cl.$^4$ ............................ C08F 4/64; C08F 10/06
[52] U.S. Cl. ..................................... 526/124; 526/125
[58] Field of Search ................................ 526/124, 125

[56] References Cited

U.S. PATENT DOCUMENTS

| | | | |
|---|---|---|---|
| 4,365,048 | 12/1982 | Ueno et al. | 526/125 |
| 4,414,132 | 11/1983 | Goodall et al. | 526/124 |
| 4,442,225 | 4/1984 | Takitani et al. | 526/125 |
| 4,460,701 | 7/1984 | Terano et al. | 526/124 |
| 4,472,521 | 9/1984 | Band | 526/125 |

Primary Examiner—Edward J. Smith

[57] ABSTRACT

A highly active and stereoselective olefin polymerization catalyst component is obtained by halogenating a magnesium compound of the formula MgR′R″ wherein R′ is an alkoxide or aryloxide group and R″ is an alkoxide or aryloxide group or halogen, with a halide of tetravalent titanium in the presence of a halohydrocarbon, and contacting the halogenated product with an acid halide and a tetravalent titanium compound.

30 Claims, No Drawings

OLEFIN POLYMERIZATION CATALYST COMPOSITIONS AND POLYMERIZATION PROCESS

This is a division of application Ser. No. 657,861, filed Oct. 5, 1984, now U.S. Pat. No. 4,535,068, which is a continuation-in-part of application Ser. No. 534,016, filed Sept. 20, 1983, now abandoned.

FIELD OF THE INVENTION

This invention relates to olefin polymerization catalyst components comprising a magnesium halide and a titanium halide and to a process for the polymerization of olefins using such catalyst components.

BACKGROUND OF THE INVENTION

Numerous proposals are known from the prior art to provide olefin polymerization catalysts by combining a solid component comprising magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

Supported coordination catalysts are disclosed in numerous patents, such as U.S. Pat. Nos. 3,953,414, 4,115,319, 4,224,181 and 4,329,253.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active coordination catalyst systems, practical considerations have led the workers in the art to concentrate on certain preferred components. The procatalysts typically comprise as dominant and essential constituents magnesium, titanium (generally in tetravalent form), chlorine and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic estr such as ethyl-para-methoxybenzoate (ethyl anisate) or methyl-p-toluate.

Among the methods of preparing procatalysts of this type, a distinction may be made between those in which the starting material is a magnesium chloride and those in which magnesium chloride is produced by halogenation of an organic compound in the course of the procatalyst synthesis.

Improved catalysts of the latter type and processes for olefin polymerization with such catalysts are disclosed in U.S. Pat. Nos. 4,329,253, 4,393,182 and European patent application No. 19,330, all by Goodall et al. The catalysts of Goodall et al employ as procatalyst a composition prepared by halogenating a magnesium compound MgR'R" (wherein R' and R" are alkyl, aryl, alkoxide or aryloxide groups and R" may also be a halogen) by reaction with a halide of tetravalent titanium in the presence of an electron donor and a halohydrocarbon followed by contact of the halogenated product with a tetravalent titanium compound.

This invention provides still further improvements of the catalysts and processes of the prior art. Catalysts which comprise the solid titanium-containing catalyst constituents of this invention in combination with an organoaluminum cocatalyst and a selectivity control agent or with an at least partial reaction product of an organoaluminum compound and a selectivity control agent are capable of producing polypropylene of commercially desired isotacticity at very high productivity.

BRIEF DESCRIPTION OF THE INVENTION

This invention provides an improvement in polymerization of alpha mono-olefins by means of supported coordination catalyst systems which comprise (a) a procatalyst, (b) a cocatalyst and (c) a selectivity control agent, wherein (a) is a highly active solid composition which comprises magnesium, tetravalent titanium, halogen and an electron donor; (b) is an aluminum alkyl; and (c) is an electron donor. Components (b) and (c) may be wholly or partly complexed with each other prior to being combined with the procatalyst.

More specifically, this invention provides a method for preparing improved procatalyst compositions whereby the halogenated product obtained by contacting a magnesium compound of the formula MgR'R" where R' is an alkoxide or aryloxide group and R" is an alkoxide or aryloxide group or halogen, with a tetravalent titanium halide in the presence of a halohydrocarbon and an electron donor is in turn treated with an acid halide of the formula

where A is an alkyl, aryl or substituted aryl group and X is a halide. Substituted aryl groups refer to those aryl groups having substituents on the benzene ring selected from the group consisting of halogens, $C_1-C_6$ alkyl groups and $C_1-C_6$ alkoxy groups. This acid halide treatment may occur prior to contacting the halogenated product with a tetravalent titanium halide or as part of the tetravalent titanium halide treatment.

Accordingly, the present invention comprises, as a minimum, these three methods for making improved procatalyst components: (Tetravalent titanium halide as mentioned below may be taken to mean the neat substance or substance as a concentrated solution in inert hydrocarbon or halohydrocarbon solvent.)

I. The method which comprises
   (a) halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product;
   (b) contacting said halogenated product with an acid halide of the formula

at a temperature of about 40° to about 140° C. (preferably 60° to 110° C.);
   (c) contacting the resulting acid halide-treated product with a tetravalent titanium halide at a temperature of about 40° to about 140° C. (preferably 60° to 110° C.); and
   (d) washing the resulting titanium halide-treated product with an inert hydrocarbon liquid.

II. The method which comprises
   (a) halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product;
   (b) contacting said halogenated product first with a mixture of an acid halide of the formula

and an tetravalent titanium halide, and then with a tetravalent titanium halide; and
   (c) washing the resulting product with an inert hydrocarbon liquid.

III. The method which comprises
   (a) halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product;
   (b) contacting said halogenated product with the mixture of a tetravalent titanium halide and an acid halide of the formula

at a temperature of about 40° to about 140° C. (preferably 60° to 110° C.), as the final halide wash which may or may not be preceded by treatment with tetravalent titanium halide.
   (c) and washing the resulting titanium halide-treated product with an inert hydrocarbon liquid.

Catalysts employing procatalysts prepared according to this invention may exhibit as much as 20% greater productivity in the production of polymer of a specific high isotacticity, compared to catalysts employing procatalysts which have not been contacted with the acid halide.

DETAILED DESCRIPTION OF THE INVENTION

The first step in preparing the procatalysts of the present invention comprises halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product.

Examples of halogen containing magnesium compounds that can be used as starting materials for the halogenating reaction are alkoxy and aryloxy magnesium halides, such as isobutoxy magnesium chloride, ethoxy magnesium bromide, phenoxy magnesium iodide, cumyloxy magnesium bromide and naphthenoxy magnesium chloride.

Preferred magnesium compounds to be halogenated are selected from magnesium dialkoxides and magnesium diaryloxides. In such compounds the alkoxide groups suitable have from 1 to 8 carbon atoms, and preferably from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium diethoxide is particularly preferred.

Magnesium compounds comprising one alkyl group and one alkoxide or aryloxide group can also be employed, as well as compounds comprising one aryl group and one alkoxide or aryloxide group. Examples of such compounds are phenyl magnesium phenoxide, ethyl magnesium butoxide, ethyl magnesium phenoxide and naphthyl magnesium isoamyloxide.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e., yielding magnesium halides in which the atomic ratio of halogen to magnesium is at least 1.5. The most preferred reactions are those leading to fully halogenated reaction products. Such halogenation reactions are suitably effected by employing a molar ratio of magnesium compound to titanium compound of 0.005:1 to 2:1, preferably 0.01:1 to 1:1. These halogenation reactions are conducted in the additional presence of an halohydrocarbon and an electron donor. An inert hydrocarbon diluent or solvent may also be present. When using an inert diluent or solvent, this should of course not be used as a complete substitute for the halohydrocarbon.

Suitable halides of tetravalent titanium include aryloxy- or alkoxy-di- and -trihalides, such as dihexanoxy-titanium dichloride, diethoxy-titanium dibromide, isopropoxy-titanium tri-iodide and phenoxytitanium trichloride; titanium tetrahalides are preferred; most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons. Chlorobenzene is the most preferred halohydrocarbon.

The halogenation normally proceeds under formation of a solid reaction product which may be isolated from the liquid reaction medium by filtration, decantation or another suitable method and may be subsequently washed with an inert hydrocarbon diluent, such as n-hexane, iso-octane or toluene, to remove any unreacted material, including physically absorbed halohydrocarbon.

The novel and unobvious aspect of the present invention comprises treating the above halogenated product with a particular acid halide prior to or concurrent with treatment with a tetravalent titanium halide.

Acid halides employed herein have the formula

where A is an alkyl, aryl or substituted aryl group and X is a halide. Substituted aryl groups refer to those aryl groups having substituents on the benzene ring selected from the group consisting of halogens, $C_1$-$C_6$ alkyl groups and $C_1$-$C_6$ alkoxy groups. Examples of substituted aryl groups include p-methoxy phenyl, p-methyl phenyl, 3,5-dichloro phenyl, and the like. Preferably, A is a phenyl group containing only H or electron withdrawing substituents on the benzene ring and X is chloride or bromide. The most preferred acid halide is benzoyl chloride.

The acid halide treatment results in significantly improved selectivity or equivalently a significant increase in the hourly productivity, measured as Kg PP/g Ti, over the productivity of untreated catalyst at the same selectivity. The amount of acid halide employed is 50 to 200 mmol per mole of Mg and preferably less than the total equivalent amount of residual alkoxide contained in the halogenated magnesium compound. Suitably, the treatment is carried out at a temperature of 40° to 140° C. during 0.1 to 4 hours. Particularly preferred contacting temperatures are from 60° to 110° C. and the most preferred contacting periods are 0.3 to 1 hour.

The product is also contacted with a tetravalent titanium compound such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the content of titanium tetrachloride in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium compound is most suitably carried out at a temperature of from 60° to 136° C. during 0.1-6 hours, optionally in the presence of an inert hydrocarbon diluent. Particularly preferred contacting temperatures are from 70° to 120° C. and the most preferred contacting periods are in between 0.5 to 3.5 hours. The treatment may be carried out in successive contacts of the solid with separate portions of TiCl$_4$.

After the treatment with tetravalent titanium compound the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent.

The preferred halogen atom, possibly contained in the magnesium compound to be halogenated, and contained in the titanium compound which serves as halogenating agent and in the tetravalent titanium compound with which the halogenated product is contacted, is chlorine.

Suitable electron donors, which are used in combination with or reacted with an organoaluminum compound as selectivity control agents and which are also used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift 2,729,126. Preferred donors are esters and diamines, particularly esters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,3,4,5-tetramethyl piperidine and similar compounds. The donor used as selectivity control agent in the catalyst may be the same as or different from the donor used for preparing the titanium containing constituent. Preferred electron donors for use in preparing the titanium constituent are ethyl benzoate and p-methyl toluate. Preferred as selectivity control agent in the total catalyst is ethyl anisate (p-methoxy ethyl benzoate).

The organoaluminum compound to be employed as cocatalyst may be chosen from any of the known activators in olefin polymerization catalyst systems comprising a titanium halide but is most suitably free of halogens. While aluminum trialkyl compounds, dialkylaluminum halides and dialkylaluminum alkoxides may be used, aluminumtrialkyl compounds are preferred, particularly those wherein each of the alkyl groups has 2 to 6 carbon atoms, e.g., aluminumtriethyl, aluminumtri-n-propyl, aluminumtri-isobutyl, aluminumtri-isopropyl and aluminumdibutyl-n-amyl.

Preferred proportions of selectivity control agent, employed separately, in combination with, or reacted with an organoaluminum compound, calculated as mol per mol aluminum compound, are in the range from 0.1 to 1.5, particularly from 0.2 to 0.5.

Proportions of electron donor contained in the solid catalyst component, calculated as mol per mol of magnesium, are suitably in the range of from 0.01 to 10, e.g., from 0.05 to 10 and from 0.1 to 5.0 and especially from 0.8 to 2.2.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1 to 150, and suitably from about 10 to about 150. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to slightly increase catalyst activity at the expense of increased catalyst residue in the unextracted product. These factors, as well as the desired level of isotacticity, will be considered in selecting the Al:Ti ratio for any given process and desired product. In general, Al:Ti ratio is in the range of 30:1 to 100:1 and especially of about 50:1 to 80:1 will be found advantageous.

Improved procatalysts prepared according to this invention are useful in the same types of polymerization of alpha-monoolefins in which the unimproved procatalysts are useful. The catalysts may be employed in the polymerization or copolymerization of alpha-monoolefins of 2 to 8 carbon atoms per molecule, conducted at conditions known for the polymerization of the respective olefins when using $MgCl_2$-supported coordination catalysts.

Polymerization of propylene as sole olefin feed or in combination with small amounts, e.g., from 1 to 20 mole percent, of ethylene, 1-butene or other alpha olefin comonomer, may be conducted with the catalysts of the invention, in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is conducted at temperatures of 50° to 80° C. and at a pressure sufficient to maintain liquid conditions.

In a continuous reaction system, the liquid in the reaction zone is maintained at reaction conditions, monomer is continuously charged to the reaction zone, catalyst components are also charged continuously or at frequent intervals to the reaction zone, and reaction mixture containing polymer is withdrawn from the reaction zone continuously or at frequent intervals.

In propylene polymerization, the reaction mixture is typically maintained at conditions at which the polymer is produced as a slurry of powder in the reaction mixture. The catalyst systems of this invention are extremely active and highly stereoselective in propylene polymerization, so that no removal of catalyst components or of atactic polymer from the polymer product is required.

Olefin polymerization may also be conducted as a solution process in which the polymer is produced as a solution in monomer or diluent. Such a process is preferred in the polymerization of 1-butene as described, for example, in U.S. Pat. No. 3,362,940.

While the catalysts of this invention are particularly adapted for use in continuous polymerization systems, they may, of course, also be employed in batch polymerization. This may be of advantage in multi-stage polymerization, such as is known for production of propylene polymers with improved impact properties, in which propylene polymers and propylene-ethylene polymers are produced in separate reaction zones arranged in sequence.

It is well known that supported coordination procatalysts and catalyst systems of the type used herein are highly sensitive, in varying degrees, to catalyst poisons such as moisture, oxygen, carbon oxides, polyolefins, acetylenic compounds and sulfur compounds. It will be understood that in the practice of this invention, as well as in the following examples, both the equipment and the reagents and diluents are carefully dried and free of potential catalyst poisons.

The productivity of the procatalyst is determined as kg polymer/g procatalyst in a standard one hour batch reaction; it may also be expressed as kg polymer/g Ti. Catalyst activity is sometimes reported as kg polymer/g procatalyst or Ti/hr. If determined in a standard one hour test, activity thus is numerically the same as productivity. However, supported coordination catalysts tend to exhibit a relatively rapid decrease in activity, so that the initial activity and the effective activity during the first 15–30 minutes of reaction may be significantly higher than activity determined in a one hour test.

The selectivity to isotactic polypropylene is determined by measuring the amount of xylene soluble polymer (XS), in accordance with regulations of the U.S. Food and Drug Administration. The XS test is carried out as follows: The sample is completely dissolved in xylene in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 20 ml aliquot of the filtrate, drying the residue under vacuum, and weighing the residue. The xylene-solubles consist of amorphous material with some low molecular weight crystalline material. (FDA regulations 121.2501 and 121.2510, 1971.)

The numerical value of XS in the case of propylene homopolymer is typically about 2 percent greater than the amount of polymers extractable in refluxing n-heptane. Thus the isotacticity index of polypropylene (amount insoluble in refluxing n-heptane) is approximately 100-(XS-2).

The selectivity to stereoregular polybutylene is determined by measuring the amount of polymer extractable from the total polymer by extraction with boiling diethyl ether. The amount of ether solubles is determined as follows:

About 2.5 grams of sample is placed in the thimble of a Soxhlet extractor with about 100 ml of anhydrous ethyl ether and subjected to extraction under reflux of the boiling ether for three hours. The flask and contents are then permitted to cool to room temperature. The amount of polymer dissolved in the ether is determined by evaporating the ether to dryness, further drying the residue in a vacuum oven at 80° C. for at least about 16 hours, and weighing the residue. The amount of undissolved polymer is recovered, dried under vacuum at 80° C. for at least about 16 hours, and weighed. The measured weights are used to calculate the percentage of dissolved and undissolved polymer.

Catalyst productivity at standard conditions exhibits an inverse relationship with stereoselectivity. This relationship is characteristic for any given procatalyst. It is generally possible to control these variables, within limits, by changing the proportion of selectivity control agent (SCA). Increasing the amount of SCA increases selectivity to isotactic or stereoregular polymer but reduces activity, and hence productivity in a standard one hour test. The relationship in propylene polymerization is such that a decrease of 1% of XS, e.g., from 5 to 4, corresponds approximately to a decrease in activity of 5 kg/g/hr. For purposes of comparison, the following examples of use of the invention in propylene polymerization show not only the measured data but productivity normalized to 4% wt XS.

The following examples illustrate the invention:

EXAMPLES

The Procatalyst

In the following examples, the procatalysts were composites of tetravalent titanium, magnesium, chlorine and electron donor. They were prepared by reacting magnesium ethoxide, titanium tetrachloride and electron donor (ED) in the presence of a halohydrocarbon at an elevated temperature to produce a solid containing Mg, Cl, Ti, —OEt groups and ED, contacting this solid with a solution of benzoyl chloride (or other acid halide as noted), the contacting the resulting solid with $TiCl_4$ in up to three additional contacting steps, and washing off unbound $TiCl_4$ by washes with a paraffinic liquid. The resulting solids were highly active and selective procatalysts in propylene polymerization.

Several separately prepared procatalysts were employed in the following examples. The procatalysts were prepared by the aforementioned methods (I, II or III) and were similar in physical and chemical properties. Catalyst E is a control and did not include a treatment with benzoyl chloride. Their compositions, by analysis, were as follows:

TABLE 1

Stoichiometric Compositions of Catalysts A through E

| Example # | Catalyst # | Ti (% w) | EB (% w) | OEt (% w) | $TiCl_4/\Sigma Ti$ m/m | Preparative Method | $EB/\Sigma Ti$ m/m |
|---|---|---|---|---|---|---|---|
| 1 | A | 2.94 | 12.6 | 0.40 | 0.86 | I | 1.37 |
| 2 | B | 2.85 | 13.7 | 0.23 | 0.91 | I | 1.53 |
| 3 | C | 2.68 | 16.9 | 0.47 | 0.81 | III | 2.01 |
| 4 | D | 2.72 | 15.2 | 0.38 | 0.85 | III | 1.78 |
| 5 | E (control) | 3.48 | 13.8 | 1.11 | 0.66 | std | 1.37 |
| 6 | F | 2.87 | — | 0.45 | 0.84 | Ia | — |
| 7 | G | 2.78 | — | 0.52 | 0.81 | Ib | — |
| 8 | H | 2.17 | — | 0.49 | 0.76 | Ic | — |
| 9 | J | 2.98 | 14.6 | 0.60 | 0.79 | Id | 1.56 | a 3,5-dichlorobenzoyl chloride used
b p-toluoyl chloride used
c p-anisoyl chloride used
d benzoyl bromide used.

Details on preparation of the catalysts are given below:

Examples 1–5

1. Magnesium ethoxide (5.72 gm, 50 mmol) was stirred at room temperature with ethyl benzoate (2.4 ml, 16.7 mmol) and 75 ml of chlorobenzene as titanium tetrachloride (75 ml, 680 mmol) was added over the course of 10 min. The mixture was brought to 110° C. and stirred for 60 min. then filtered hot. The resulting solid ("S") was slurried in chlorobenzene (60 ml) containing benzoyl chloride (0.31 ml, 2.7 mmol) and held at 110° C. for 20 min. then filtered hot. The resulting solid was washed for 10 minutes each with two 60 ml portions of $TiCl_4$ at 110° C. and filtered hot. The resulting solid was washed at room temperature with six 150 ml portions of isopentane then dried under moving nitrogen at 40° C. Yield 5.77 gm of procatalyst "A".

2. Procatalyst "B" was prepared by essentially the same procedure except that the benzoyl chloride treatment was carried out for 60 min. at 110° C. and that the two succeeding 110° C. $TiCl_4$ washes were with only 40 ml of titanium tetrachloride. Yield 6.5 gm.

3. Magnesium ethoxide (5.72 gm, 50 mmol) was stirred at room temperature with benzoyl chloride (1.8 ml, 15.6 mmol to generate ethyl benzoate in situ) and 75 ml of chlorobenzene as titanium tetrachloride (75 ml, 680 mmol) was added over the course of 10 min. The mixture was brought to 100° C. and stirred for 180 min. then filtered hot. The resulting solid was slurried in 40 ml of chlorobenzene and held at 100° C. for 120 min. then filtered hot. The resulting solid was slurried in titanium tetrachloride (40 ml) containing benzoyl chloride (0.6 ml, 5.2 mmol) and held at 100° C. for 120 min. then filtered hot. The resulting solid was washed at room temperature with seven 150 ml portions of isopentane then dried under moving nitrogen at 40° C. for 100 min. Yield 5.82 gm of procatalyst "C".

4. Solid "S", as prepared in example 1, was slurried in 40 ml of titanium tetrachloride and held at 110° C. for 60 min. then filtered hot. The resulting solid was slurried in 40 ml of titanium tetrachloride containing benzoyl chloride (0.4 ml, 3.5 mmol) and held at 110° C. for 60 min. then filtered hot. The resulting solid was washed, at room temperature, with six 150 ml portions of isopentane then dried under moving nitrogen at 40° C. Yield 6.2 gm of procatalyst "D".

5. (Control) Solid "S", as prepared in example 1, was treated three times with 40 ml of $TiCl_4$ held at 110° C. for 10 min. each and filtered hot. The resulting solid was washed, at room temperature, with six 150 ml portions of isopentane then dried under moving nitrogen at 40° C. for 100 min. Yield 6.32 gm of procatalyst "E".

6. Procatalyst "F" was prepared by essentially the procedure of Example 2 except that 0.38 ml (2.7 mmol) of 3,5-dichlorobenzoyl chloride was used instead of benzoyl chloride.

7. Procatalyst "G" was prepared by essentially the procedure of example 2 except that 0.5 ml (3.8 mmol) of p-toluoyl chloride was used instead of benzoyl chloride.

8. Procatalyst "H" was prepared by essentially the procedure of example 2 except that 3.0 ml (18 mmol) of ethyl-p-anisate was used to prepare solid "s" (instead of ethyl benzoate) and 0.31 ml (2.1 mmol) of anisoyl chloride was used instead of benzoyl chloride.

9. Procatalyst "J" was prepared by essentially the procedure of example 2 except that 0.32 ml (2.7 mmol) of benzoyl bromide was used instead of benzoyl chloride.

Propylene Polymerization

Unless otherwise stated, propylene polymerization was conducted as follows:

About 1400 gm of liquid propylene and 132 mmol of hydrogen in a one gallon (about 4 liter) autoclave equipped with an agitator, was heated to 60° C. under sufficient pressure to maintain it in liquid phase. A predetermined amount (0.18–0.22 mmol) of p-ethyl anisate (pEA) and 2.5 ml (0.7 mmol) of triethyl aluminum (TEA) as a 5% wt solution in $C_7$–$C_8$ paraffin diluent were then successively added to the propylene. To the agitated mixture there was added a sufficient amount of the slurry of procatalyst in mineral oil to provide about 0.01 milliatoms of titanium.

The mixture was agitated and maintained at 67° C. for one hour. The pressure was then released and the 350 to 500 gm of powdered polypropylene recovered.

For the eight examples listed in Table 2 (examples 10–18) the xylene solubles were analyzed to be from 3.8 to 4.8%. For convenience of comparison the measured productivities were corrected slightly to equivalent productivities at 4% xylene solubles by using the aforementioned, experimentally determined ratio of 4.7 kg PP/g cat %XS hr.

TABLE 2
Polypropylene Productivities of Catalysts A through E

| Example # | Procatalyst # | Productivity Kg PP/g Ti hr at 4% X.S. |
|---|---|---|
| 10 | A | 976 (average of 5 runs) |
| 11 | B | 950 (average of 3 runs) |
| 12 | C | 1040 |
| 13 | D | 994 |
| 14 | E | 790 (control) |
| 15 | F | 906 |
| 16 | G | 701 |
| 17 | H | 571 |
| 18 | J | 983 |

What is claimed is:

1. A process for the catalytic polymerization of an olefin by contact with a catalyst composition comprising an organoaluminum compound, a selectivity control agent and a solid titanium-containing catalyst component in which the atomic ratio of aluminum to titanium is from 1:1 to 150:1, wherein said solid component is obtained by:
   (a) halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product;
   (b) contacting said halogenated product with an acid halide of the formula $$\underset{A-C-X}{\overset{O}{\parallel}}$$

where A is an alkyl, aryl or substituted aryl group and X is a halide, said substituted aryl group having substituents on the benzene ring selected from the group consisting of halogens, $C_1$–$C_6$ alkyl groups and $C_1$–$C_6$ alkoxy groups, at a temperature of about 40° to about 140° C.;
   (c) contacting the resulting acid halide-treated product with a tetravalent titanium halide at a temperature of about 40° to about 140° C.; and
   (d) washing the resulting titanium halide-treated product with an inert hydrocarbon liquid.

2. The process of claim 1 wherein said magnesium compound is a magnesium dialkoxide.

3. The process of claim 1 wherein said halohydrocarbon is a chlorohydrocarbon.

4. The process of claim 1 wherein said acid halide is an acid chloride.

5. The process of claim 1 wherein said electron donor is an aromatic ester.

6. The process of claim 1 wherein said magnesium compound is magnesium diethoxide, said halohydrocarbon is chlorobenzene, said titanium halide is titanium tetrachloride, said electron donor is ethylbenzoate, and said acid chloride is benzoyl chloride.

7. The process of claim 1 wherein said olefin is propylene.

8. The process of claim 7 wherein said organoaluminum compound is triethyl aluminum and said selectivity control agent is an aromatic ester.

9. The process of claim 8 wherein said aromatic ester is ethyl anisate.

10. The process of claim 8 wherein the molar ratio of selectivity control agent to organoaluminum compound is between 0.1 to 1.5 mol per mol.

11. A process for the catalytic polymerization of an olefin by contact with a catalyst composition comprising an organoaluminum compound, a selectivity control agent and a solid titanium-containing catalyst component in which the atomic ratio of aluminum to titanium is from 1:1 to 150:1, wherein said solid component is obtained by:
   (a) halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product;
   (b) contacting said halogenated product with a mixture of an acid halide of the formula $$\underset{A-C-X}{\overset{O}{\parallel}}$$

where A is an alkyl, aryl or substituted aryl group and X is a halide, said substituted aryl group having substituents on the benzene ring selected from the group consisting of halogens, $C_1$–$C_6$ alkyl groups and $C_1$–$C_6$ alkoxy groups, and a tetravalent titanium halide at a temperature of about 40° to about 140° C., and then with a tetravalent titanium halide at a temperature of about 40° to about 140° C.; and
   (c) washing the resulting product with an inert hydrocarbon liquid.

12. The process of claim 11 wherein said magnesium compound is a magnesium dialkoxide.

13. The process of claim 11 wherein said halohydrocarbon is a chlorohydrocarbon.

14. The process of claim 11 wherein said acid halide is an acid chloride.

15. The process of claim 11 wherein said electron donor is an aromatic ester.

16. The process of claim 11 wherein said magnesium compound is magnesium diethoxide, said halohydrocarbon is chlorobenzene, said titanium halide is titanium tetrachloride, said electron donor is ethylbenzoate, and said acid chloride is benzoyl chloride.

17. The process of claim 11 wherein said olefin is propylene.

18. The process of claim 17 wherein said organoaluminum compound is triethyl aluminum and said selectivity control agent is an aromatic ester.

19. The process of claim 18 wherein said aromatic ester is ethyl anisate.

20. The process of claim 18 wherein the molar ratio of selectivity control agent to organoaluminum compound is between 0.1 to 1.5 mol per mol.

21. A process for the catalytic polymerization of an olefin by contact with a catalyst composition comprising an organoaluminum compound, a selectivity control agent and a solid titanium-containing catalyst component in which the atomic ratio of aluminum to titanium is from 1:1 to 150:1, wherein said solid component is obtained by:
    (a) halogenating a magnesium compound of the formula MgR'R" where R' is an alkoxide or aryloxide group and R" is an alkoxide or aryloxide group or halogen, with a tetravalent titanium halide in the presence of a halohydrocarbon and an electron donor, therein forming a halogenated product;
    (b) contacting said halogenated product with the mixture of a tetravalent titanium halide and an acid halide of the formula

where A is an alkyl, aryl substituted alkyl or substituted aryl group and X is a halide, said substituted aryl group having substituents on the benzene ring selected from the group consisting of halogens, $C_1$–$C_6$ alkyl groups and $C_1$–$C_6$ alkoxy groups at a temperature of about 40° to about 140° C. as the final halide wash; and
    (c) washing the resulting product with an inert hydrocarbon liquid.

22. The process of claim 21 wherein said magnesium compound is a magnesium dialkoxide.

23. The process of claim 21 wherein said halohydrocarbon is a chlorohydrocarbon.

24. The process of claim 21 wherein said acid halide is an acid chloride.

25. The process of claim 21 wherein said electron donor is an aromatic ester.

26. The process of claim 21 wherein said magnesium compound is magnesium diethoxide, said halohydrocarbon is chlorobenzene, said titanium halide is titanium tetrachloride, said electron donor is ethylbenzoate, and said acid chloride is benzoyl chloride.

27. The process of claim 21 wherein said olefin is propylene.

28. The process of claim 27 wherein said organoaluminum compound is triethyl aluminum and said selectivity control agent is an aromatic ester.

29. The process of claim 28 wherein said aromatic ester is ethyl anisate.

30. The process of claim 28 wherein the molar ratio of selectivity control agent to organoaluminum compound is between 0.1 to 1.5 mol per mol.

* * * * *